United States Patent [19]

Collin

[11] 4,098,604

[45] Jul. 4, 1978

[54] METHOD FOR REDUCTION IN A FLUID BED OF FINE GRAINED MATERIAL CONTAINING IRON OXIDE

[75] Inventor: Per Harald Collin, Falun, Sweden

[73] Assignee: Stora Kopparberg Bergslags Aktiebolag, Falun, Sweden

[21] Appl. No.: 662,912

[22] Filed: Mar. 1, 1976

[30] Foreign Application Priority Data

Mar. 3, 1975 [SE] Sweden .............................. 7502369

[51] Int. Cl.² .............................................. C22B 1/10
[52] U.S. Cl. ...................................................... 75/26
[58] Field of Search ........................................... 75/26

[56] References Cited

U.S. PATENT DOCUMENTS 3,295,961   1/1967   Colombo ................................. 75/26
3,607,224   9/1971   Blaskowski ............................. 75/26

Primary Examiner—P. D. Rosenberg
Attorney, Agent, or Firm—Curtis, Morris & Safford

[57] ABSTRACT

A method for partial reduction in a fluid bed of a fine grained iron oxide containing material whereby a fine grain low sulphur content mixture of partially reduced iron oxide containing material and coke is produced; the coke is obtained from carbonaceous material with a relatively high content of sulphur; accordingly, the combination allows the utilization of carbonaceous materials with a relatively high content of sulfur for the reduction of iron oxide and subsequent production of iron or steel without transferring the sulfur into the final product but separating it therefrom during the partial reduction of the iron oxide.

7 Claims, 1 Drawing Figure

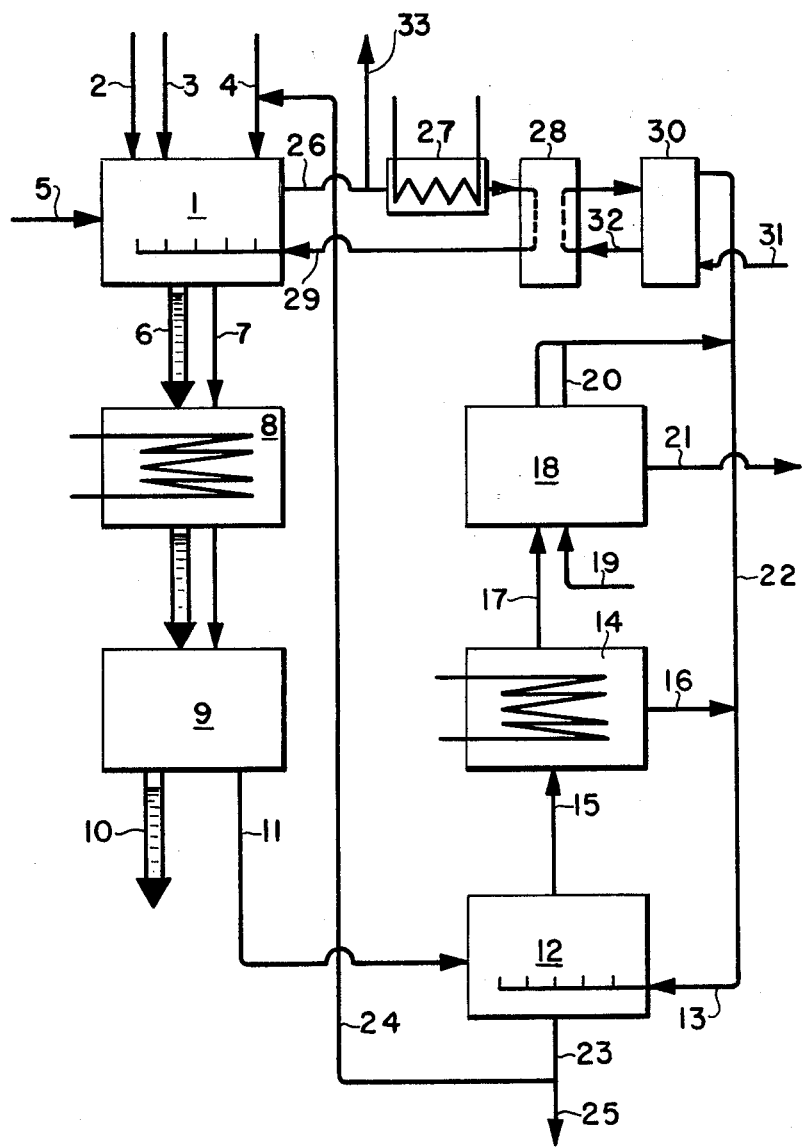

METHOD FOR REDUCTION IN A FLUID BED OF FINE GRAINED MATERIAL CONTAINING IRON OXIDE

This invention pertains to a method related to a reduction in a fluid bed of fine grained, iron oxide containing material whereby a fine grained low-sulphurous mixture of partly reduced, iron oxide containing material and coke is produced, the last, from a fine grained solid carbonaceous material, may partly be replaced by liquid carbonaceous material which likewise may have a high content of sulphur.

DESCRIPTION OF THE INVENTION

In accordance with the invention, the fluid bed for the above reduction may be of any known type; especially suitable fluid bed is a circulating fluid bed, also called fast fluid bed, as defined by Reh in "Fluidized Bed Processing," Chemical Engineering Progress, Vol. 67, No. 2, February 1971, pp. 58 to 63. Thus, the invention which is schematically illustrated in the FIGURE preferably embodies a continuous fluid bed apparatus 1, which is maintained at a temperature of 800° to 1200° C. A suitable fluid bed apparatus is readily available and is being operated by introduction of an appropriately adjusted flow (i.e., stream) of sulfur containing fine grained solid and, as a further embodiment, an appropriately adjusted flow of a liquid carbonaceous material 2, an appropriately adjusted flow of a fine grained, iron oxide containing material 3, an appropriately adjusted flow of a fine grained CaO- and/or $CaCO_3$-containing material 4, and a reducing gas for fluidization. The reducing gas may be generated in the bed by partial combustion of the carbonaceous material with an appropriately adjusted flow of air or oxygen 5 or in a separate apparatus outside the bed.

In order to obtain the desired mixture of partly reduced, iron containing material and coke in which the two materials to a substantial extent form so called "micro-aggregates," the two materials are according to the invention introduced into the bed in a manner described in a companion disclosure, that is, U.S. application Ser. No. 578,422, filed May 19, 1975 abandoned, refiled as continuation Ser. No. 810,977 June 29, 1977, now U.S. Pat. No. 4,084,958. Thus, the iron oxide containing material is introduced within limited zones around the inlets for solid carbonaceous material, where the volatile constituents of said carbonaceous material are expelled and partly gasified and coked.

In order to bind sulphur which is introduced into the bed together with the carbonaceous material, an appropriately adjusted stream of fine grained CaO and/or $CaCO_3$-containing material (for instance burnt lime, burnt dolomite, limestone, dolomite) is introduced outside the zones of the bed, where the volative constituents of the solid carbonaceous material are partly gasified and the carbonaceous material is partially coked. The burnt lime, which is introduced into or formed in the bed under the therein prevailing reducing conditions, binds the sulphur leaving the carbonaceous material in the form of CaS. Preferably a flow stream of CaO- and/or $CaCO_3$-containing material is supplied to the bed whereby the content of Ca (elemental basis) corresponds at least to double the equivalent of sulphur (on elemental basis) in the stream of the carbonaceous material. This means that only 50% of available CaO is transformed to CaS, the result being a very low content of sulphur in the desired mixture of partly reduced, iron oxide containing material and coke.

According to the invention, a stream is tapped from the reducing fluid bed and adjusted in such a way that the quantity of material in the bed is maintained substantially constant. The tapped material consists of a mixture of micro-aggregates 6 of partly reduced, iron oxide containing material and coke, not aggregated particles of the said materials, and particles 7 containing CaO/CaS.

The tapped bed material then is cooled at 8 to a temperature below the Curie-point of iron, after which the tapped material is subjected to magnetic separation at 9. The result is a magnetic fraction 10 with a low sulphur content and mainly containing micro-aggregates of partly reduced, iron oxide containing material and coke and non-aggregated, partly reduced, iron oxide containing material. The ashes in the carbonaceous feed are also contained in the magnetic fraction because of their content of partly reduced iron oxide. The non-magnetic fraction 11 consists mainly of CaO/CaS-containing material and coke.

The magnetic fraction may advantageously be used for production of crude iron and crude steel, for instance by melt reduction in an electric arc furnace.

The non-magnetic, sulphur containing fraction may either be dumped or after driving off its content of sulphur be used as CaO- and/or $CaCO_3$-containing material in the reducing fluid bed.

In order to make re-utilization of the starting materials possible, the non-magnetic, sulphur containing fraction is fed to a fluid bed 12 suitably of conventional type, maintained at an increased temperature, suitably 500° to 750° C, and at increased pressure, suitably >1 atm gauge, preferably between 5 and 20 atm, continuously fluidized by a gas mixture 13 containing $H_2O$ and $CO_2$, suitably in a volume ratio >1, preferably between 3 and 4.

The main part of the sulphur content in the non-magnetic fraction is thereby expelled in the form of $H_2S$ which can be illustrated by the formula:

$$CaO + CaS + H_2O + 2 CO_2 = 2 CaCO_3 + H_2S$$

The reaction is exothermic and no heat has to be supplied. A necessary cooling of the bed is simply achievable by generating steam, including saturated steam, in the bed by injection of water. After condensation, at 14 of the main part of the surplus $H_2O$ (steam) 16 in the reaction gas 15, a gas 17 is obtained with a high content of $H_2S$. The sulphur content of this gas suitably is recovered in a known way according to the Claus-process[x) ] at 18, the sulphur being obtained in the form of elementary sulphur.

x) See for example LURGI Handbuch, Ausgabe 1970, section 10.1

The simplest way to carry out the partial combustion of $H_2S$ necessary in the Claus-process is by means of oxygen 19. The result is that the gases 20, after the Claus-reaction and after condensation of sulphur at 21, contain only $H_2O$, $CO_2$ and a slight amount of $H_2S$. This makes recirculation of gas 22 to the bed 12 possible, the need for external $CO_2$ thereby being minimized.

The hold-up of the bed material in the sulphur separation bed is maintained constant by tapping an adjusted flow 23 thereof. Material thus tapped contains $CaCO_3$-containing material, possibly with minor quantities of CaO and CaS, and coke. The major part 24, suitably >90%, of the tapped bed material can be re-utilized in the reduction fluid bed for binding new quantities of sulfur. A minor part 25 has, however, to be bled off and dumped in order to avoid accumulation of incombustible non-magnetic ash components in the bed for driving off sulphur.

The need of $CO_2$ for separation of sulphur is thus covered partly 20 from the Claus-process and partly from another $CO_2$ source. A suitable source is the exhaust gas 26 from the reducing fluid bed, which among other constituents contains $CO_2$. After dust cleaning and cooling at 27 of an appropriately adjusted partial stream of this exhaust gas, the main part of its $CO_2$ content is separated at 28 in a known way in an absorption solution containing for instance potash, ethanolamine or a similar absorbing substance suitable for $CO_2$ absorption. Absorbed $CO_2$ is driven off at 30 from the absorbing solution in a known way, e.g., with steam 31, after which the solution is re-circulated 32.

The exhaust gas leaving the $CO_2$-absorption, from which gas the main part of its $CO_2$ content and $H_2O$ has been separated, is a strongly reduced gas, which contains besides $N_2$ also CO and $H_2$. This reducing gas 29 is utilized for fluidizing the reduction in the reducing fluid bed. Surplus 33 of the gas formed by the reduction is tapped and used for instance for pre-treatment of the raw materials introduced in the reduction furnace, or for generating of electrical energy.

The amount of sulphur in the partially reduced iron oxide containing material depends on the content of CaO in the reducing bed. If this corresponds at least to double the equivalent of the sulphur, the sulphur content of the partially reduced iron, will be below 0.05% by weight.

A solid or liquid carbonaceous material of a relatively high content of sulphur is considered to have sulphur in excess of 1% by weight.

As it is evident from the above, the present invention allows in a combination of steps and reactions to obtain partially reduced iron oxide such as in a microaggregate form without transfering sulfur from the carbonaceous material to the reduced metal but instead of separating sulfur therefrom as part of the overall process with concomitant improvements in efficiencies and utilization of recycle streams and starting materials.

As a further illustration of the invention an illustrative material balance based on the flows per minute in a circulating fluid bed with a reactor hight of 20 m and a diameter of 2 m is enclosed.

| Flow No. | Kg/min | Content |
| --- | --- | --- |
| 2 | 105 | Coal (56% solid carbon, 5% water, 25,2% volatiles, 2% sulphur, 7% ash) |
| 3 | 561 | Iron ore (concentrate of $Fe_3O_4$, 6,7% gangue) |
| 4 | 6 | Limestone (38% Ca) |
| 5 | 62 | Air |
| 6,7 | 683 | Solid discharge |
| 10 | 507 | Magnetic fraction (52,2% metallic iron, 29.6% FeO, 8% coke, 10,2% gangue and ash, sulphur content below 0.05) |
| 11 | 176 | Nonmagnetic fraction (5.8% metallic iron, 3.4% FeO, 62.5% coke, 13.5% CaS, 13.3% CaO 1.7% gangue and ash) |
| 13 | 114.2 | Gas mixture (51.2 kg $CO_2$, 63 kg $H_2O$, 10 atm gauge |
| 15 | 85.9 | $H_2S$-containing gas mixture (13 kg $H_2S$, 16.8 kg $CO_2$, 56.1 kg $H_2O$) |
| 17 | 29.8 | $H_2S$ + $CO_2$ (13 kg $H_2S$, 16.8 kg $CO_2$) |
| 19 | 12.2 | Oxygen |
| 20 | 23.7 | 16.8 kg $CO_2$, 6.9 kg $H_2O$ |
| 21 | 12.2 | Sulphur |
| 23 | 208.9 | Desulphurized nonmagnetic fraction (4.6 % metallic iron, 2.7% FeO, 53.4% coke, 38.0% $CaCO_3$, 1.2% gangue and ash, CaS 0.1%) |

-continued

| Flow No. | Kg/min | Content |
| --- | --- | --- |
| 24 | 188 | Recirculated nonmagnetic fraction |
| 25 | 20.9 | Bleed off |
| 26 | 1250 | Exhaust gas (21.1% CO, 10.5% $CO_2$, 6.7% $H_2$, 4.7% $H_2O$, 2.1% hydrocarbons, 54.9% $N_2$; % by volume) |
| 33 | 1000 | Surplus gas |
| 29 | 210 | Exhaust gas from which $CO_2$ and $H_2O$ has been separated (24.5% CO, 1.2% $CO_2$, 7.7% $H_2$, 0.4% $H_2O$, 2.5% hydrocarbons, 63.7% $N_2$). |

What is claimed is:

1. A method for reduction of fine-grained, iron oxide containing material in the form of micro-aggregates in a fluid bed for manufacturing a low-sulphurous content, fine-grained mixture of partly reduced, iron oxide containing material and coke, using as a carbonaceous material a solid carbonaceous material containing sulphur, or a solid and liquid carbonaceous material containing sulphur comprising:
   A. maintaining a fluid bed at 800° to 1200° C,
   B. introducing into said fluid bed a stream of:
      a. a member of the group consisting of fine-grained solid carbonaceous material and a mixture of fine-grained solid and liquid carbonaceous material,
      b. fine-grained material containing iron oxide,
      c. fine-grained material containing a member of the group consisting of CaO, $CaCO_3$, and mixtures of both, and
      d. a reducing gas for fluidization, said material containing iron oxide being introduced within the limited zones around a plurality of inlet zones for the solid carbonaceous material where the volatile constituents of said carbonaceous material are expelled and partly gasified and coked, while the material containing a member of the group consisting of CaO, $CaCO_3$, and mixtures of both is introduced outside said zones,
   C. tapping the material in said fluid bed, in the form of particles, at such an adjusted rate that the fluid bed material in said fluid bed has a constant hold-up amount therein,
   D. cooling the tapped material, in the form of particles, below the Curie-point of iron and subsequently magnetically separating said tapped material into particles of
      a. a magnetic low-sulphurous fraction mainly containing partly reduced iron oxide containing material, coke and ashes, and
      b. a non-magnetic fraction mainly comprising at least one member selected from the group CaO, CaS, a mixture of CaO and CaS, and coke, at least part of the non-magnetic fraction being recycled in the form of particles after separation of sulphur content therefrom.

2. The method as defined in claim 1, wherein the flow of at least one member of the group consisting of CaO, $CaCO_3$, and mixtures of both in the fine-grained material containing the same supplied to the reduction fluid bed, corresponds to at least double the equivalent flow of sulphur in said sulphur containing carbonaceous material supplied to said fluid bed.

3. The method as defined in claim 1, wherein the magnetic fraction in particulate form subsequently is reduced to crude iron or crude steel by melt reduction.

4. The method as defined in claim 1, wherein the main portion of sulphur in said non-magnetic fraction, in a particulate form, is transformed to $H_2S$ by bringing said fraction into contact with a gas mixture containing $H_2O$ and $CO_2$ at raised pressure in a fluid bed whereby $H_2S$ containing gas is obtained.

5. The method as defined in claim 4, wherein the gas containing $H_2S$, after condensation of the main portion of water therein is treated according to Claus-process for recovering the sulphur content of said gas in the form of elementary sulphur.

6. The method as defined in claim 4, wherein the hold-up of said fluid bed material in the bed used for separation of sulphur is maintained substantially constant by tapping a stream of particulate bed material and whereby the major part, including $>90\%$, of the tapped particulate bed material, which comprising at least one member of the group consisting of $CaCO_3$, $CaO$, $CaS$, mixtures of the same, and coke is, after removal of sulfur content thereof, recirculated in the form of particulates to said fluid bed wherein said reduction of iron takes place and said particulate material is thereby reutilized as a sulphur binding agent.

7. The method as defined in claim 1, wherein the reduction of iron oxide is in a circulating fluid bed.

* * * * *